Patented July 7, 1936

2,046,546

UNITED STATES PATENT OFFICE 2,046,546

PROCESS FOR THE REMOVAL OF INSECTICIDAL RESIDUES FROM FRUITS AND VEGETABLES

Roscoe H. Carter, Washington, D. C.; dedicated to the free use of the Public of the United States of America No Drawing. Application May 23, 1934, Serial No. 727,140

11 Claims. (Cl. 99—103)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of the patent to me.

This invention relates to the use of certain combinations of chemicals to remove or dissolve certain insecticidal residues from deciduous fruits and from vegetables.

It has been found by experimentation that salts of aluminum such as the sulphate and chloride when added to water or to aqueous solutions of hydrochloric acid or sulphuric acid materially increase their solvent action on residues left after spraying or dusting with certain insecticidal materials.

The residues in question are fluorine-containing deposits remaining on fruits and vegetables after the application of such materials as sodium fluoaluminate (cryolite, natural or synthetic), potassium fluoaluminate, barium fluosilicate, sodium fluosilicate, sodium fluoferate, potassium fluoferrate, nicotine fluosilicate, etc.

The deciduous fruits referred to are apples, pears, plums, prunes, peaches, apricots, quinces, cherries, grapes, currents, gooseberries, raspberries, strawberries, blackberries, etc. The vegetables include beans, celery, greens such as spinach, chard, etc., peas, lettuce, tomatoes, etc.

The removal of the insecticidal residues is effected by washing the fruit or vegetables in a suitable washing apparatus with water or an aqueous solution of hydrochloric acid or sulphuric acid to which has been added aluminum salts at such concentrations as will be effective. For most purposes the concentration of the acid should be from 0.1 percent to 2.5 percent hydrochloric acid (HCl) or sulphuric acid ($H_2SO_4$) and the concentration of the aluminum salts from 1 percent to 5 percent aluminum sulphate ($Al_2(SO_4)_3.18H_2O$) or aluminum chloride ($AlCl_3$).

The concentrations of solvents and length of time required for removal of the residues are dependent on the temperature of the solution, the type of washing machine and amount of agitation, the amount and nature of the residue present and the amount of wax or oil that may be on the fruit at the time of washing. The higher the temperature of the cleaning solution the shorter the time required to remove the residues from the fruit and vegetables, such temperature, of course, not being sufficiently high as to injure the fruit or vegetables. After treatment in this cleaning solution the fruit or vegetables are rinsed with water to remove the cleaning solution.

Having fully disclosed my discovery, I claim:

1. A process for the removal of insecticidal fluorine residues from fruits and vegetables comprising the application to the fruits and vegetables of a water solution of aluminum sulphate followed by washing with water to remove said solution.

2. A process for the removal of insecticidal fluorine residues from fruits and vegetables comprising the application to the fruits and vegetables of a water solution of aluminum chloride followed by washing with water to remove said solution.

3. A process for the removal of insecticidal fluorine residues from fruits and vegetables comprising the application to the fruits and vegetables of a water solution of hydrochloric acid and also aluminum sulphate followed by washing with water to remove said solution.

4. A process for the removal of insecticidal fluorine residues from fruits and vegetables comprising the application to the fruits and vegetables of a water solution of hydrochloric acid and also aluminum chloride followed by washing with water to remove said solution.

5. An improved washing solution for removing fluorine residues from fruits and vegetables comprising water, hydrochloric acid and aluminum sulphate.

6. An improved washing solution for removing fluorine residues from fruits and vegetables comprising water, hydrochloric acid and aluminum chloride.

7. A process for the removal of insecticidal fluorine residues from fruits and vegetables comprising the application to the fruits and vegetables of a water solution of sulfuric acid and also aluminum sulfate followed by washing with water to remove said solution.

8. A process for the removal of insecticidal fluorine residues from fruits and vegetables comprising the application to the fruits and vegetables of a water solution of sulfuric acid and also aluminum chloride followed by washing with water to remove said solution.

9. An improved washing solution for removing fluorine residues from fruits and vegetables comprising water, sulfuric acid and aluminum sulfate.

10. An improved washing solution for removing fluorine residues from fruits and vegetables comprising water, sulfuric acid and aluminum chloride.

11. A process for the removal of insecticidal fluorine residues from fruits and vegetables comprising the application to the fruits and vegetables of a water solution of a mineral acid selected from the group consisting of hydrochloric acid and sulfuric acid and also an aluminum salt selected from the group consisting of aluminum sulfate and aluminum chloride, followed by washing with water to remove said solution.

ROSCOE H. CARTER.